Patented Mar. 5, 1935

1,993,722

UNITED STATES PATENT OFFICE 1,993,722

CHLOR-SULPHONATED AROMATIC HYDROCARBONS

Lucas P. Kyrides, St. Louis, Mo., assignor to Monsanto Chemical Company, St. Louis, Mo., a corporation of Delaware No Drawing. Application June 29, 1931, Serial No. 547,794

2 Claims. (Cl. 260—158)

This invention relates to a novel class of organic compositions having as their base the material obtained by the chlorsulphonation of ortho-dichlorbenzene.

When mono-chlorbenzene is chlorinated, one obtains a mixture of ortho- and para-dichlorbenzene together with a small quantity of trichlorbenzene. From this chlorinated mixture a major quantity of para-dichlorbenzene may be separated by crystallization. The liquid fraction so obtained consists essentially of approximately 80% ortho-dichlorbenzene, 17-18% para-dichlorbenzene and a small amount of trichlorbenzene. Trichlorbenzene may be separated either from the original chlorinated mixture or after the major portion of the para-dichlorbenzene has been isolated by crystallization by subjecting such mixture to fractional distillation. However, it is uneconomical to recover the remaining portion of the para-dichlorbenzene.

I have found that by subjecting this eutectic mixture of ortho- and para-dichlorbenzene to chlorsulphonation one is enabled to chlorsulphonate the ortho-dichlorbenzene without attacking to any appreciable extent the para-dichlorbenzene present in the reacted mixture. The chlorsulphonated product may be recovered by distillation or in any other desired manner. It possesses properties which are characteristic of aromatic sulphon-chlorides. Thus, for example, it may be reacted with ammonia to form the amide which in turn may be reacted with aldehydes to form clear resinous products similar to those obtained by the reaction of benzene-, toluene- or xylene-sulphon-amides with aldehydes. Similarly, the chlorsulphonated ortho-dichlorbenzene may be reacted with ethylamine to form the N-ethyl sulphon-amide of ortho-dichlorbenzene.

The object of this invention is to provide a method of recovering the para-dichlorbenzene present in a eutectic mixture of ortho- and para-dichlorbenzenes as well as to provide a novel class of compounds obtained by the chlorsulphonation of such eutectic mixtures.

One method of procedure consists in adding over a period of 4 hours, 1 mol of a eutectic mixture of dichlorbenzene consisting approximately of 80% ortho-dichlorbenzene and 20% para-dichlorbenzene to 3 mols of chlorsulphonic acid while maintaining a temperature of 20-25° C. After the addition of the dichlorbenzene is complete, the reaction is allowed to proceed for 10-14 hours. Approximately .7 mol of HCl is evolved. The reacted mixture is then quenched with ice and the product is separated from the aqueous medium by adding benzene thereto. After washing the benzene layer with water, it is dried and distilled, preferably in vacuo. In the course of distillation, the benzene is distilled over as the initial product. Thereafter the para-dichlorbenzene is recovered, and finally the ortho-dichlorbenzene-sulphon-chloride distills at 155° C. at 18 mm. pressure. A small amount of residue remains. The sulphon-chloride product crystallizes at approximately 16° C.

Ortho-dichlorbenzene-sulphon-chloride which may be prepared in the manner described in the previous paragraph may be converted into the amide by adding the same to a solution of ammonium hydroxide. The amidated product so obtained has a melting point of approximately 134° C. The yield is over 90% of the theory. Apparently, the product contains some of the ammonium salt of the dichlorbenzene-sulphonamide. A clear resinous product may be obtained by reacting the crude amide prepared in the manner hereinabove described with an aldehyde such as formaldehyde. The procedure consists in refluxing approximately equal molar proportions with aqueous formaldehyde for 5 hours. Thereafter the water present is separated and a clear resinous product is obtained.

N-alkyl substituted dichlorbenzene-sulphonamides can be prepared by any known methods. To illustrate, N-ethyl-dichlorbenzene-sulphonamide may be made conveniently by reacting the sulpho-chloride with ethylamine in the presence of an aqueous solution of sodium hydroxide in a manner analogous to the procedure employed in preparing ethylated benzene or toluene sulphonamide derivatives. The product is purified by dissolving in concentrated aqueous sodium hydroxide and is precipitated by means of hydrochloric acid. Upon crystallization from alcohol, a product having a melting point of approximately 83.5° C. which is very soluble in the common organic solvents but which is practically insoluble in water is obtained. The same product as well as the di-substituted product may also be obtained by subjecting the dichlorbenzene-sulphon-amide to the action of ethyl-chloride in the presence of caustic soda.

N-alkyl substituted sulphon-amide derivatives have been found to have properties which render them useful as plasticizers for cellulose acetate and cellulose nitrate, and may be employed for this purpose in a manner analogous to that now employed in connection with the N-alkyl substituted benzene-, toluene- and xylene sulphonamide compositions. The resinous products obtained by the condensation of an aldehyde such as formaldehyde, acetaldehyde, benzaldehyde, etc., with the dichlorbenzene-sulphon-amide are soluble in the ordinary lacquer solvents and may be incorporated advantageously with cellulose acetate and cellulose nitrate to form films, lacquers, etc. For this purpose the resinous products may be employed in a manner analogous to that now employed in connection with the toluene-sulphon-amide formaldehyde resinous reaction products. These resinous compositions are likewise valuable as delustering agents for artificial silk and are employed in a manner well known to those skilled in the art.

By treating the dichlorbenzene-sulphon-amide with sodium hypochlorite, one obtains the chloramine which has been found to have properties similar to other aromatic chloramines and may be employed in lieu of other chloramines, notably, chloramine-T, as a disinfectant, deodorant or a sterilizing agent.

From the foregoing description, it will be apparent that the present invention affords a novel method of separating para-dichlorbenzene, from a eutectic mixture thereof with ortho-dichlorbenzene, as well as to afford a novel class of compositions having the structural formula:

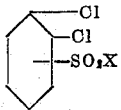

where "X" may be a chlorine atom, $NH_2$ group, $NH_2$ which has been condensed with an aldehyde such as formaldehyde, acetaldehyde, benzaldehyde, etc., an

where "alkyl" represents an alkyl group, such as methyl, ethyl, butyl, etc., an

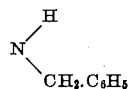

a chloramine group

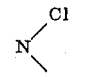

such as is obtained when the amide is caused to react with sodium hypochlorite, or

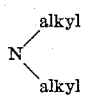

such as is obtained by reacting the amide with the alkyl chloride in the presence of caustic soda.

What I claim is:

1. A product having the following structural formula:

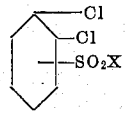

where X is

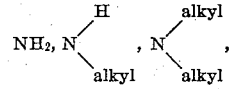

and

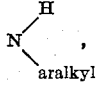

aralkyl being a phenyl substituted alkyl group which alkyl group is joined to the nitrogen atom.

2. The reaction product obtained by first causing orthodichlorbenzene to combine with chlorsulphonic acid to form the mono sulpho chloride of orthodichlorbenzene which sulpho chloride is subsequently combined with ammonia.

LUCAS P. KYRIDES.